(12) United States Patent
Weres

(10) Patent No.: US 12,486,168 B2
(45) Date of Patent: Dec. 2, 2025

(54) INCREASING YIELD OF HYPOBROMITE WHEN A BROMIDE SALT IS REACTED WITH BLEACH

(71) Applicant: Oleh Weres, Reno, NV (US)

(72) Inventor: Oleh Weres, Reno, NV (US)

(*) Notice: Subject to any disclaimer, the term of this patent is extended or adjusted under 35 U.S.C. 154(b) by 0 days.

(21) Appl. No.: 18/965,959

(22) Filed: Dec. 2, 2024

(65) Prior Publication Data

US 2025/0178896 A1    Jun. 5, 2025

Related U.S. Application Data

(60) Provisional application No. 63/606,291, filed on Dec. 5, 2023.

(51) Int. Cl.
*C01B 11/20* (2006.01)
(52) U.S. Cl.
CPC .................... *C01B 11/20* (2013.01)
(58) Field of Classification Search
None
See application file for complete search history.

(56) References Cited

U.S. PATENT DOCUMENTS

| | | | |
|---|---|---|---|
| 5,422,126 A | 6/1995 | Howarth et al. | |
| 11,884,540 B2 | 1/2024 | Weres et al. | |
| 2020/0138953 A1* | 5/2020 | Panicheva | A01N 25/22 |
| 2022/0388843 A1* | 12/2022 | Weres | B01J 19/0033 |
| 2024/0116758 A1 | 4/2024 | Weres et al. | |

* cited by examiner

*Primary Examiner* — Sheng H Davis
(74) *Attorney, Agent, or Firm* — Oleh Weres

(57) ABSTRACT

Adding acid to a solution containing bleach and soluble bromide salt accelerates the reaction producing sodium hypobromite which has a pronounced yellow color. The amount of acid needed to provide complete reaction can be controlled by measuring light absorbed by the solution. Add acid until Absorbance stops increasing, indicating complete conversion of NaBr to NaOBr. The amount of acid added can also be controlled by measuring pH before and after adding NaBr to diluted bleach. When enough acid has been added to fully neutralize sodium hydroxide in the bleach and provide nearly 100% conversion, the difference between the two pH values becomes positive and continuous to increase, whereby acid feed can be controlled to make pH change equal to or greater than a predetermined positive value.

20 Claims, 5 Drawing Sheets

Spectra of NaOBr, NaOCl and Br₂

Figure 5
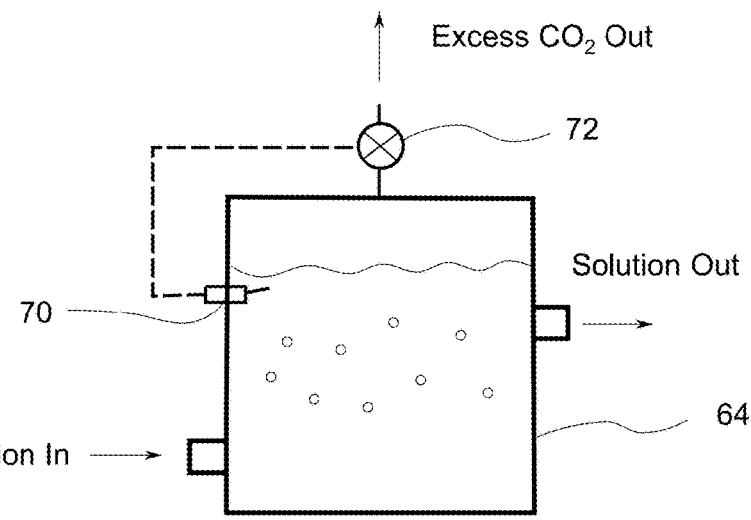
Gas Separator 56C
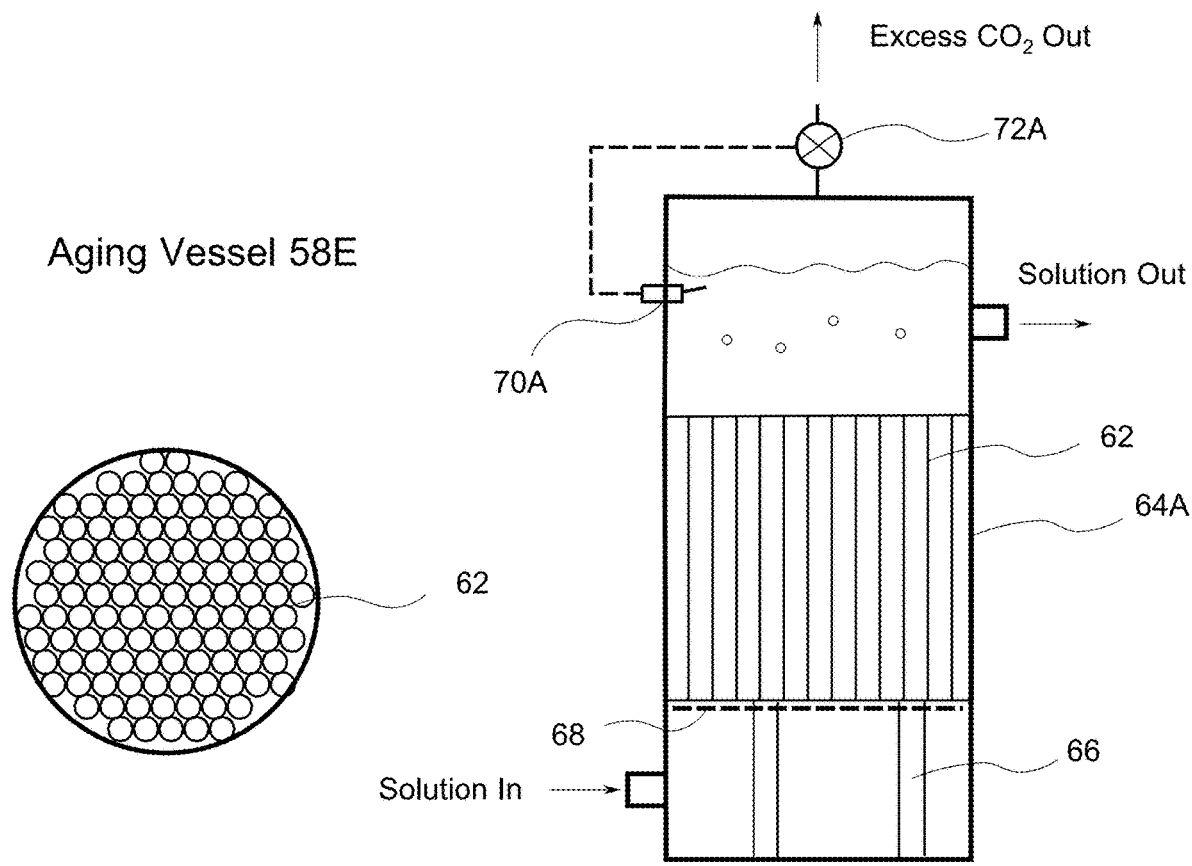
Aging Vessel 58E

INCREASING YIELD OF HYPOBROMITE WHEN A BROMIDE SALT IS REACTED WITH BLEACH

The present Regular Patent Application claims benefit of Provisional Patent Application 63/606,291 filed Dec. 5, 2023.

FIELD OF INVENTION

This disclosure describes methods for controlling the amount of acid added to a solution comprising a bromide salt and bleach to increase the rate of reaction, thereby increasing the yield of hypobromite.

BACKGROUND OF THE INVENTION

U.S. Pat. No. 11,884,540 of Weres and Baron is hereby included by reference.

The present Regular Patent Application claims benefit of Provisional Patent Application 63/606,291 filed Dec. 5, 2023.

Hypobromous acid (HOBr) and hypobromite anion (OBr$^-$) are more effective biocides than hypochlorous acid (HOCl) and hypochlorite anion (OCl$^-$). Likewise, monobromamine (NH$_2$Br) produced by reaction of HOBr with ammonia in the water treated is a more effective biocide than monochloramine (NH$_2$Cl). Sodium hypobromite is commonly produced by reacting bleach containing sodium hypochlorite with sodium bromide (NaBr). Potassium bromide or another soluble bromide salt can also be used. Combining a solution of sodium bromide with bleach containing a modest excess of sodium hypochlorite in a tank is the simplest way to conduct this reaction, but has two basic disadvantages: (a) it is a batch process poorly suited for an application requiring continuous feed of sodium hypobromite, and (b) sodium hypobromite decomposes on standing.

Sodium hypobromite is also produced in a continuous manner, by combining pumped streams of sodium bromide solution and bleach, usually with water of dilution also added.

Sodium hydroxide is added to bleach to slow decomposition of sodium hypochlorite.

Industrial bleach commonly contains about 1.76 mols/L of sodium hypochlorite ("12.5% active chlorine"), an equimolar concentration of sodium chloride, and typically 4 to 10 g of NaOH per liter, sufficient to induce room temperature pH 13 or higher.

The reaction of bromide ion with hypochlorite ion producing hypobromite and chloride is very slow due to electrostatic repulsion of the two anions:

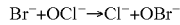

Reaction of bromide with hypochlorous acid is very much faster, and is the major pathway producing hypobromous acid:

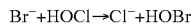

In the presence of NaOH, a very small fraction of hypochlorite is protonated producing HOCl and the reaction is slow in proportion. Frequently, time available for reaction is limited, whereby only a fraction of NaBr provided is converted to NaOBr before the mixed solution is delivered to the water treated.

In U.S. Pat. No. 11,884,540 Weres and Baron teach adding a predetermined or actively controlled amount of acid to a solution comprising bleach and a soluble bromide salt to increase the rate of reaction producing hypobromite, thereby increasing the yield of hypobromite. Various methods to predetermine or actively control the amount of acid are disclosed, including measuring Absorbance of light by the mixed solution, and measuring pH at a single point.

SUMMARY OF THE INVENTION

Improved methods of controlling the amount of acid added are provided, based on laboratory experiments wherein pH and Absorbance of light were measured while hypobromite was produced.

The hypobromite ion absorbs light much more strongly than hypochlorite (FIG. 1). Therefore, Absorbance at a given wavelength is proportional to the concentration of hypobromite in the solution.

Absorbance proportional to hypobromite concentration increases with the amount of acid added until bromide is fully converted to hypobromite. When Absorbance of light at predetermined time after the solution is compounded is plotted as a function of acid added, slope of the plot abruptly drops to near zero at that point. Controlling the amount of acid added to slightly exceed the amount at which slope drops enables practically 100% conversion of bromide to hypobromite.

The pH change that results when bromide salt is added to a solution comprising diluted bleach and acid depends on how much acid has been added to the solution and the concentration of hydroxide ion remaining. If some hydroxide remains in the solution, adding bromide salt causes pH to decrease slightly. However, if the amount of acid equals or exceeds the amount of hydroxide initially present and no hydroxide remains, pH increases by nearly a full pH unit after bromide salt is added. Under these conditions, all of the NaBr is converted to NaOBr. Therefore, the amount of acid added can be controlled by adjusting acid feed to keep the pH change greater than or equal to a predetermined positive value.

DESCRIPTION OF DRAWINGS

FIG. 5 illustrates a gas separator which removes unreacted bubbles of CO$_2$ and an aging vessel which provides time needed for the reaction to take place.

DEFINITION OF TERMS

"Transmittance" or "T" is the fraction of light illuminating the sample cell in a spectrophotometer or colorimeter which passes through the cell, normally recorded at a single wavelength.

"Absorbance" or "A" is related to transmittance by $$A = -\log_{10} T$$

When most or all of the light absorbed is absorbed by a single species in the sample, Absorbance is proportional to the concentration of that species in solution.

In the Tables and Examples "C" is shorthand for the amount of carbon dioxide or another acid added to diluted bleach in mols/Liter, abbreviated "M".

"Ln" represents natural logarithm.

Three Tables are appended following the Conclusions and Ramifications, before the Claims.

DETAILED DESCRIPTION OF THE INVENTION

The several Examples that follow provide a detailed description of the invention.

Comparison Example

Figure 1:
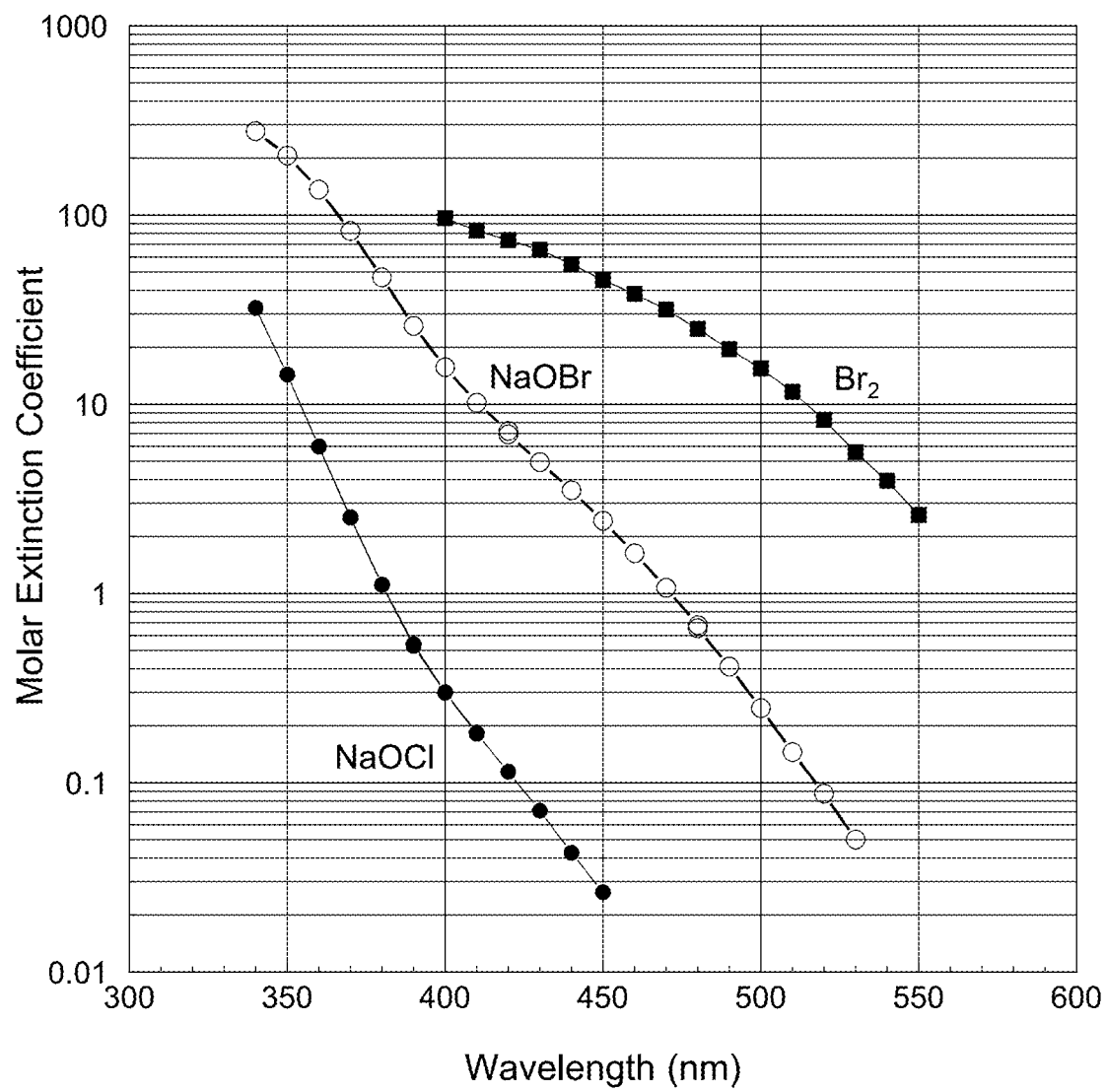
FIG. 1 presents the absorption spectra of NaOCl, NaOBr and Br$_2$.

NaBr absorbs light more strongly than NaOCl (FIG. 1) whereby progress of the reaction producing NaOBr can be followed by measuring Absorption of light of a convenient wavelength.

Figure 2:
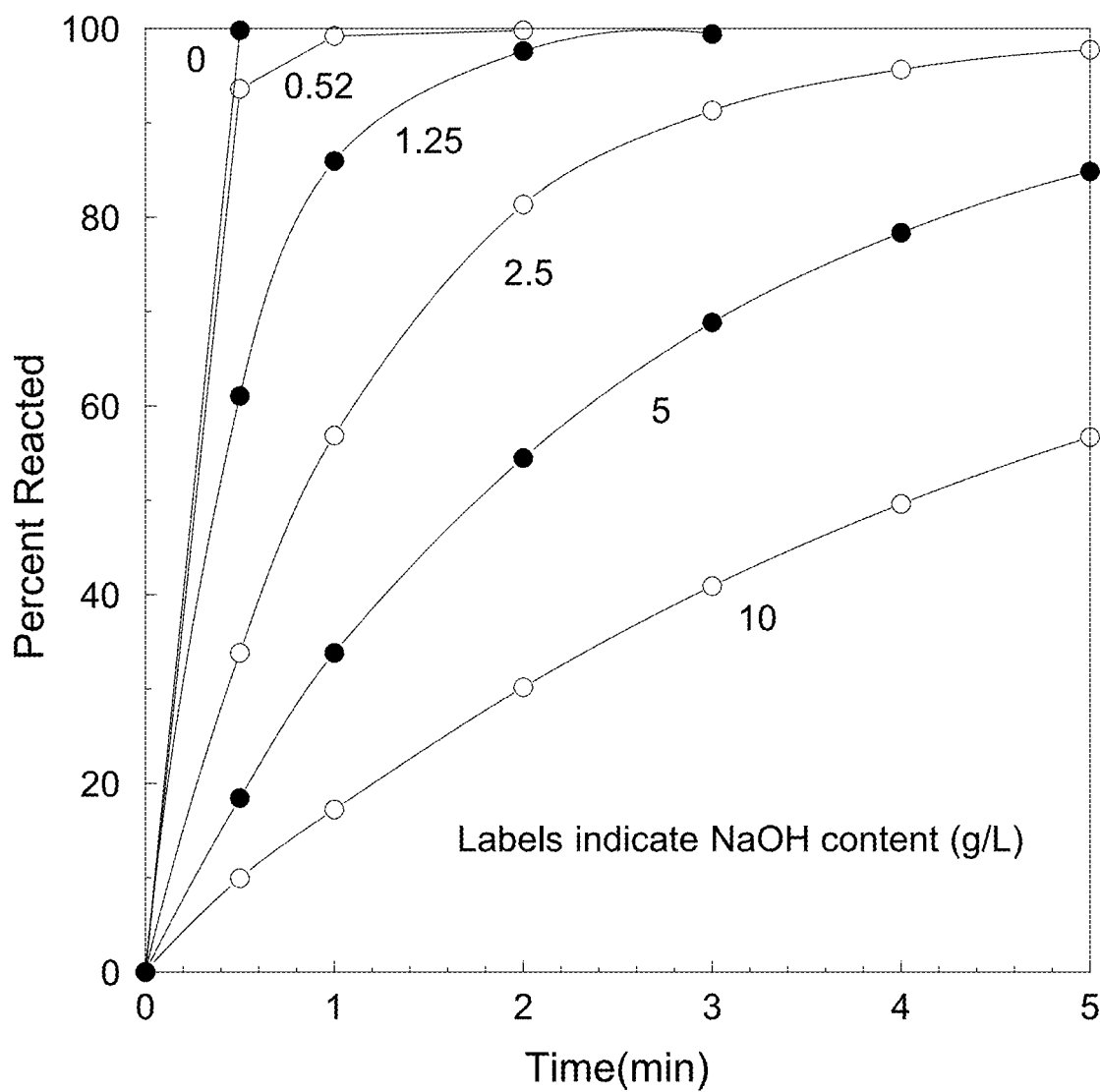
FIG. 2 illustrates the effect of NaOH content of the bleach upon the rate of reaction of diluted bleach with NaBr producing NaOBr.

FIG. 2 illustrates progress of the reaction producing hypobromite as a function of time after sodium bromide is added to bleach diluted with water. Sodium hydroxide content of a bleach initially containing 0.52 g/L (=13 mM) NaOH, 14 mM $Na_2CO_3$ and 1.404M NaOCl (=9.95 w % active $Cl_2$) was adjusted by adding HCl or NaOH, and the resulting modified bleaches containing different concentrations of NaOH were tested and compared.

In each case, 0.56 mL of 40.8 w % NaBr solution was added to 10 mL of bleach diluted to 36%, and Absorbance in a 1 cm square cell recorded at 460 nm. (Initial ratio of NaOCl to NaBr=1.50.) The Absorbance values recorded were divided by Absorbance corresponding to 100% conversion, and the results plotted as percent of bromide converted as a function of time. The proportions of bleach, water and NaBr were selected to match an actual application treating a cooling tower.

Time needed to reach 100% conversion of bromide to hypobromite depends on concentration of NaOH in the bleach. With bleach containing 0, 0.52 and 1.25 g/L NaOH, >99% conversion is achieved in 0.5, 1 and 3 minutes, respectively. With bleaches containing 2.5, 5 and 10 g/L more than 5 minutes is required to approach 100% conversion.

Example 1

Table 1 summarizes the results of a similar series of tests, with the same bleach compositions diluted to 41 v % and amount of NaBr adjusted to retain mole ratio 1.50. The pH of the diluted bleach was recorded before and after adding NaBr. The four tests in the series simulate the effect of adding increasing amounts of acid, for example HCl, to bleach which initially contains 2.5 g/L NaOH.

The pH values reported throughout were measured using a pH electrode calibrated using phosphate buffers at pH 7.01 and 11.50.

Where some NaOH remains in the bleach, a small decrease of pH was recorded, but when remaining NaOH=0, there was a substantial increase. The transition from negative to positive pH change occurs at remaining NaOH between 0.52 and 0 g/L, and between 92.5 and 100% of NaBr converted to NaOBr at 30 seconds.

The pH increase occurs because HOBr is a weaker acid than HOCl, and hypobromite ion produced by the reaction consumes protons, driving up pH:

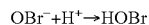

$$OBr^- + H^+ \rightarrow HOBr$$

Example 2

Table 2 summarizes the results of a test series which simulates adding increasing amounts of carbon dioxide to diluted bleach that contains 4 g/L=100 mM NaOH. Dilution of bleach and amount of NaBr added were as described in Example 1. Concentration of $CO_2$ added (or rather simulated) is presented in the first column and the equivalents of NaOH, $Na_2CO_3$ and $NaHCO_3$ present in the mixed solution in the next three columns.

At first, adding $CO_2$ converts NaOH to $Na_2CO_3$ until all of the NaOH is gone at 50 mM $CO_2$. Adding more $CO_2$ converts $Na_2CO_3$ to $NaHCO_3$ until all of the $Na_2CO_3$ is gone and only $NaHCO_3$ remains at 100 mM $CO_2$.

The next three columns present pH of the diluted bleach solution before and after adding NaBr, and the pH change resulting. As in Table 1, there is a small negative pH change while some NaOH remains, but the change is positive at 50 mM $CO_2$ and beyond where no NaOH remains.

Table 2 illustrates an important advantage of using $CO_2$ to neutralize NaOH in the bleach by converting it to $Na_2CO_3$. Adding $CO_2$ in excess of the amount needed to fully neutralize NaOH converts part of the $Na_2CO_3$ to $NaHCO_3$ whereby the resulting solution is strongly buffered and pH never drops to the point that a significant fraction of hypobromite ion is protonated converting it to HOBr or significant halogen species are produced.

Example 3

In Tables 1 and 2, ΔpH goes from negative to positive just before NaOH remaining in the bleach goes to zero and NaBr converted to NaOBr reaches 100%. Table 2 shows that ΔpH continues to increase as acid, in this case $CO_2$, is added in excess of the amount needed to neutralize NaOH initially present in the bleach.

Therefore, the amount of acid needed to fully neutralize NaOH and approach 100% conversion of NaBr to NaOBr can be monitored and controlled thus:

(a) Measuring $pH_{Before}$ of the solution comprising bleach and water before adding NaBr, (b) Measuring $pH_{After}$ of the solution after NaBr has been added, (c) Calculating $\Delta pH = pH_{After} - pH_{Before}$ and (d) Adjusting the amount of acid added to make ΔpH equal to a predetermined value or within a certain range; for example, ΔpH=0.5 or ΔpH between 0.4 and 0.5. Simply maintaining ΔpH>0 may suffice.

Figure 3:
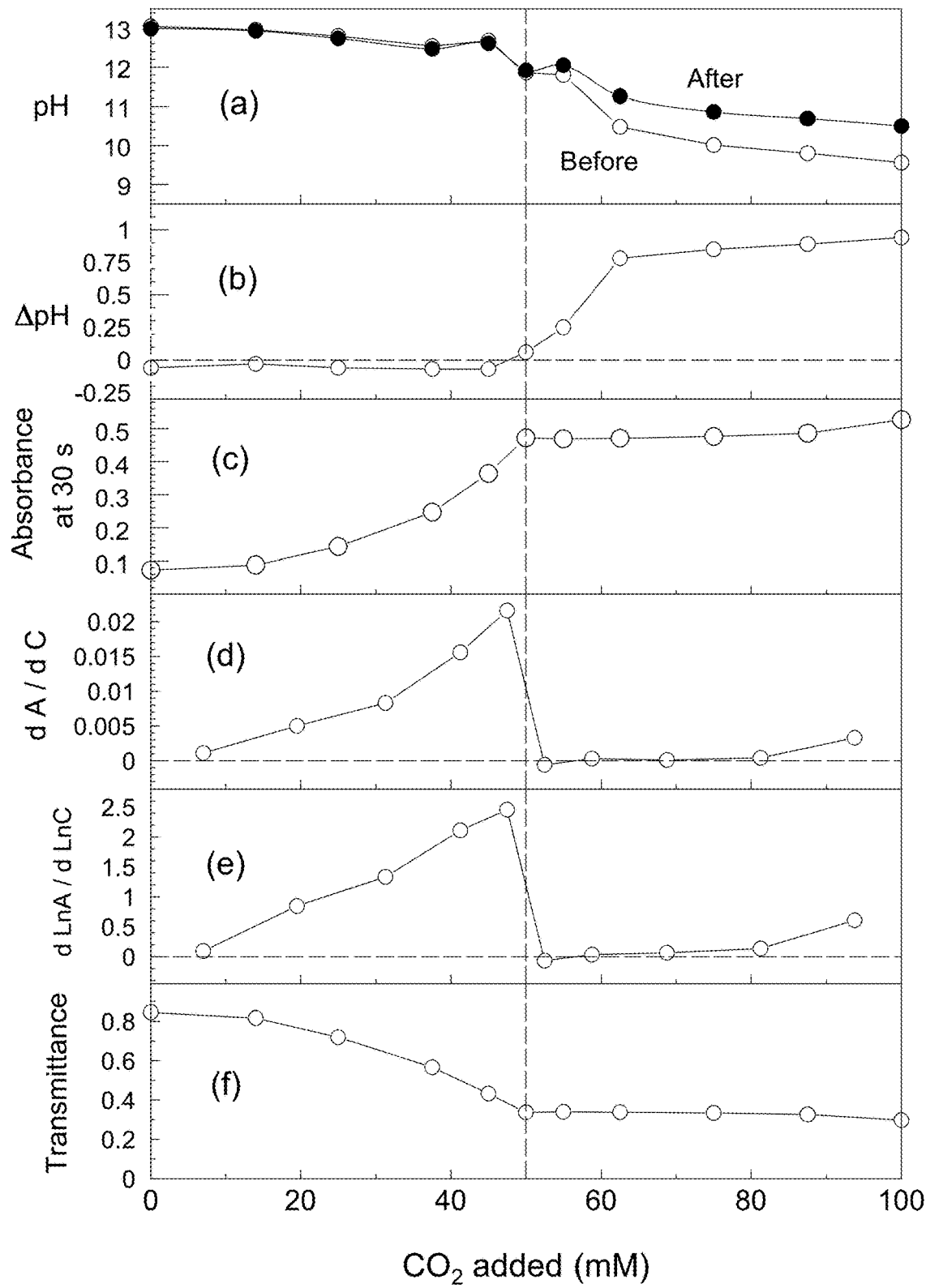
FIG. 3 illustrates the effect of adding increasing amounts of CO$_2$ to bleach initially containing 4 g/L NaOH and 10 g/L active chlorine.

FIG. 3, parts (a) and (b) illustrate the values of $pH_{Before}$, $pH_{After}$ and ΔpH in Table 2. The amount of $CO_2$ to make ΔpH=0.5 is about 15% more than required to neutralize all of the NaOH in the bleach. A modest excess of $CO_2$ is unobjectionable, because the resulting solution is strongly buffered.

The points in FIG. 3(a) at 45 and 55 mM $CO_2$ are out of line with adjacent points due to a common error encountered measuring pH. The tests with 45 and 55 mM $CO_2$ were run at a later date to fill in the plot, and freshly made pH 11.50 phosphate buffer was used to calibrate the pH electrode (together with pH 7.01 phosphate buffer). However, the plot of ΔpH in FIG. 3(b) is perfectly smooth, because offset in the values of $pH_{Before}$ and $pH_{After}$ is the same, and the offset cancels out when $pH_{After} - pH_{Before}$ is calculated. The smooth plot in FIG. 3(b) demonstrates the advantage of controlling acid feed based on ΔpH instead of a single value of pH as taught by Weres and Baron. High salinity and pH near 12 constitute a hostile environment for pH electrodes, making it hard to record a reproducible pH value, and response of the pH electrode is likely to drift. Additionally, the pH value recorded will depend on the buffers used to calibrate the electrode. However, if the two pH electrodes used to measure $pH_{Before}$ and $pH_{After}$ are identical, of similar age and calibrated together, the effects of calibration error and drift will nearly cancel out, enabling good control of acid feed to be attained.

FIG. 4(a) illustrates a practical installation which might, for example, be used to treat water in a cooling tower. First, water and bleach are combined, and the amount of $CO_2$ or another acid added is controlled by control unit 40A; alternatively, a human operator could control the amount of acid added. If $CO_2$ is employed as the acid, it should be added to the diluted bleach through a frit producing fine bubbles which favor good mass transfer. This mixture passes through in-line mixer 42A, then flows past $pH_{Before}$ electrode 44A installed in a pipe-T, and enters pipe or hose 46A which carries it some distance to $pH_{After}$ electrode 48A. Finally, the reacted solution is added to the water being treated through discharge assembly 50A which comprises one or more nozzles designed to impinge the solution onto water being treated with elevated velocity, whereby the reacted solution quickly mixes with and is dispersed in the water.

This arrangement has the advantage that electrode 48A measures $pH_{After}$ after the reaction has run to completion, but has the disadvantage of requiring a long cable connecting electrode 48A to control unit 40A.

FIG. 4(b) illustrates an arrangement which avoids the inconvenience of using a long cable. In fact, the two electrodes don't have to be very far apart, because the time needed to ΔpH to start increasing is much less than the time needed to approach 100% conversion. Therefore, electrodes 44B and 48B can be located just a few feet apart. In this case, a second in-line mixer 52B is needed to provide rapid mixing of NaBr solution with the diluted bleach.

If $CO_2$ is used, an inhibitor to control calcium carbonate deposits should be included, because the calcium likely to be present in the water used to dilute the bleach would otherwise react with carbonate ion produced depositing $CaCO_3$. Ideally, the inhibitor should be added to the water before the water is combined with bleach, but can also be provided as an additional constituent of the NaBr solution. Using an inhibitor is also beneficial when an acid other than $CO_2$ is used, because high pH of the diluted bleach may induce deposits if calcium and bicarbonate are both present in the water used. An inhibitor not containing nitrogen is preferred; for example PBTC (2-Phosphonobutane-1,2,4,-tricarboxylic Acid), polymaleic acid, polyacrylic acid, etc.

Example 4

Table 2 also presents values of optical Absorbance 30 seconds after NaBr solution was added to the diluted bleach. Absorbance was measured at 460 nm in a 1 cm square cell. Absorbance 30 s after adding NaBr to the diluted bleach increases as the amount of $CO_2$ added increases, and nearly levels off at 50 mM $CO_2$ indicating that 100% of the NaBr is converted to NaOBr.

Beyond 50 mM $CO_2$ Absorbance at 30 s continues to increase much more slowly. This increase is due to formation of halogen species as pH decreases further, most likely BrCl and $BrCl_2^-$.

Each test was run until Absorbance stabilized and a the Final value was recorded. For tests at 50 mM $CO_2$ and above, the Final value was recorded at five minutes. In every case, Absorbance at five minutes was less than Absorbance at 30 s and nearly constant between 0.460 and 0.475. This decrease beyond 30 s evidences decomposition of the halogen species. Absolute value of the decrease is proportional to halogens present at 30 s which increase as $CO_2$ increases and pH drops. Because halogen species are strongly colored, a small amount produces a measurable increase in Absorbance. Absorbance of elemental bromine ($Br_2$) is presented in FIG. 1 as an example of a strongly colored halogen species similar to BrCl.

The Absorbance data are more closely examined in Table 3. The short lines in Table 3 repeat values of $CO_2$ concentration and Absorbance from Table 2. The long lines between them contain midpoint values, and the difference between adjacent values of $CO_2$ and Absorbance. These values are combined to calculate derivatives in the right half of the Table.

$\Delta A/\Delta C \approx d\ A/d\ C$ the derivative of $A$ over $C$ $\Delta C/C \approx \Delta \ln C$ $\Delta A/A \approx \Delta \ln A$ $(\Delta A/A)/(\Delta C/C) \approx d \ln A/d \ln C$ Both derivatives drop sharply at $CO_2$=50 mM where 100% conversion of NaBr to NaOBr is achieved and Absorbance stops increasing.

Example 5

Plots of Absorbance A, dA/dC and d ln A/d ln C are presented in FIGS. 3(c), 3(d) and 3(e). The slope dA/dC necessarily depends of the actual values of dA and dC and the range of values covered by A and C. Dividing dA and dC by A and C removes this dependence whereby d ln A/d ln C more closely resembles a universal function describing the system over a wide range of actual values.

The actual decrease of dA/dC and d ln A/d ln C at $CO_2$=50 mM is more abrupt than it appears in FIGS. 3(d) and 3(e) because resolution of the plots is limited by the number of values in the data set.

All spectrophotometers and many colorimeters measure Absorbance, but a simple colorimetric device might simply measure Transmittance T, which is proportional to current passing through the photocell.

FIG. 3(f) shows T as a function of $CO_2$ added. As with dA/dC, the the absolute value of dT/dC drops abruptly at 50 mM $CO_2$.

The break in plots of A and T vs. C and abrupt decrease of the derivatives directly signals 100% conversion of NaBr to NaOBr and provides several possibilities to determine and control the amount of $CO_2$ or another acid added to achieve 100% conversion.

If the amount of $CO_2$ or another acid added to the solution is controlled by a human operator, the proper amount of acid can be determined by gradually increasing the amount of acid added until absorbance essentially stops increasing but don't overfeed to the point that A starts increasing again.

A control unit comprising a computer or microprocessor can be programmed to implement the same or similar approach in a variety of ways.

The control unit can be programmed to determine the proper amount of acid by increasing the amount of acid added until the value of dA/dC, d ln A/d ln C, Abs(dT/dC) or a similar function suddenly decreases. (These derivatives are functions of C.) At that point, the amount of acid will be just slightly greater than needed to fully neutralize NaOH and achieve 100% conversion. The control unit can also be programmed to keep the value of dA/dC, d ln A/d ln C, Abs(dT/dC) or a similar function within a predetermined range of values; for example, dA/dC less than 10% of its peak value.

The amount of acid needed may change if the amount of bleach provided to the process or NaOH content of the bleach changes with time. The control unit can further be programmed to periodically cycle acid feed down and up, to redetermine the amount of acid needed.

Overfeeding acid should be avoided to limit the amount of acid consumed, and to avoid excessive decrease in pH favoring protonation of hypobromite and production of halogen species. Excess $CO_2$ causes Absorbance to resume increasing (FIG. 3(c)); dA/dC, d ln A/d ln C and Abs(dT/dC) also increase (FIG. 3, Table 3).

Programming the control unit to keep d ln A/d ln C or another derivative function below a predetermined value will provide 100% conversion without overfeeding acid; for example, $d \ln A/d \ln C < 0.05$ Avoiding overfeed is especially important if HCl or another strong acid is used instead of $CO_2$, because in that case the reacting solution will be weakly buffered and the interval between acid sufficient to neutralize NaOH and excessively low pH values will be narrow.

Figure 4:
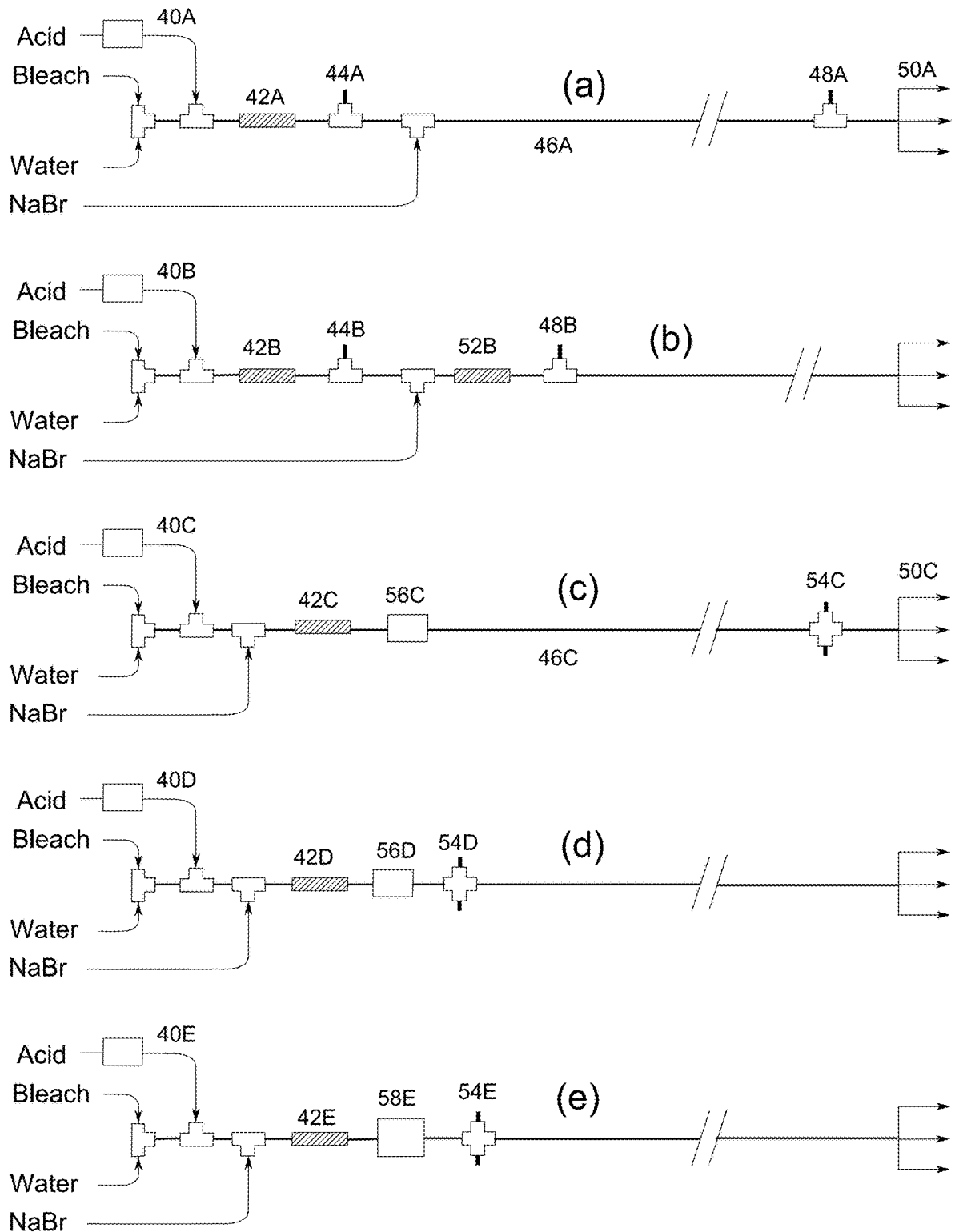
FIG. 4 illustrates several practical implementations of the invention.

FIG. 4, parts (c), (d) and (e) illustrate practical implementations of process control measuring Absorbance or Transmittance of the reacted solution.

FIG. 4(c) illustrates the simplest, most direct implementation. Optical module 54C comprises a light emitting diode and a photo diode installed in a pipe T facing each other through transparent windows. The windows may be glass or a plastic not attacked by bleach; for example, polymethyl-methylacrylate (PMMA). The optical module is installed near to discharge assembly 50C whereby Absorbance of the solution is measured shortly before it is discharged to the water treated, fully reacted. This arrangement requires a long cable along pipe 46C connecting optical module 54C to control unit 40C.

In-line mixer 42C is needed to quickly start the reaction, especially if $CO_2$ is used. If $CO_2$ is used, the solution may contain some undissolved bubbles which would interfere with measuring Absorbance. If this problem is encountered, gas separator 56C should be added to remove bubbles before the solution reaches optical module 54C.

FIG. 5 illustrates a simple gas separator. The solution flows in at the bottom of tank 64 and out near the top. Diameter of the tank is large enough to make vertical velocity of the liquid less than the rate at which bubbles rise. Excess $CO_2$ accumulates at the top of the tank, depressing liquid level. When liquid level drops below float switch 70, valve 72 opens allowing gas to escape.

FIG. 4(d) shows optical module 54D located close to where bleach, water, acid and NaBr are combined and not far from control unit 40D whereby the need for a long connecting cable is avoided. This arrangement requires more acid be added to accelerate the reaction to completion in the short time available from mixing the chemicals to optical module 54D. The lower pH resulting favors protonation of hypo-bromite and formation of halogen species whereby less NaOBr is delivered to the water treated and hazardous fumes may be generated.

This problem is avoided in FIG. 4(e), where aging vessel 58E is added before optical module 54E. Means to remove unreacted gas bubbles can incorporated in the design of aging vessel 58E or a separate gas separator employed.

One design of aging vessel 58E is illustrated in FIG. 5. A bundle of pieces of pipe 62 is installed inside tank 64A. Three or four longer pieces extend to the bottom of the tank and support the bundle. The solution flows in near the bottom of the tank. Perforated plate 68 distributes flow evenly across the bottom of the bundle. The solution flows up through the bundle, each pipe serving as a plug flow reactor. Because vertical velocity is small, reaction time inside the pipes is comparable to reaction time in the long connecting pipe 46C in FIG. 4. The aging vessel also serves as a gas separator, with excess $CO_2$ discharged through valve 72A when liquid level drops below float switch 70A.

Aging vessel 58E can also be a round coil of tubing or a polygonal coil of pipe long enough to provide reaction time comparable to pipe 46C. For example, 50 pieces of pipe 2 feet long, connected using 90 degree pipe angles would provide the same reaction time as 100 feet of straight pipe.

Example 6

In some applications the water treated will contain ammonia or ammonium ion in solution. Ammonium ion reacts with hypochlorite and hypobromite, producing monochloramine and monobromamine, respectively:

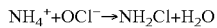

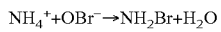

These reactions are fast, and fastest between pH 7 and 8, values frequently encountered in the water treated.

In this situation, adding acid to accelerate conversion of NaBr to NaOBr serves to increase the amount of $NH_2Br$ produced in the water treated, a desirable result, as $NH_2Br$ has greater biocidal effect than $NH_2Cl$.

CONCLUSIONS AND RAMIFICATIONS

The highly concentrated, highly alkaline solution produced when bleach is reacted with sodium bromide is a hostile environment for pH electrodes, whereby it is hard to obtain a precise, repeatable pH value. However, the difference between pH values recorded by two electrodes is more reliable, because the two electrodes will be affected in the same way. Similarly, measured light absorbance will depend on concentration of the solution, cell geometry and wavelength, whereby change in light absorbance is a more reliable indicator of reaction progress than a single value of absorbance.

Improved methods of process control based on the difference between pH values measured by two electrodes and change in absorbance are provided.

Carbon dioxide is used to adjust pH in the preferred embodiment of the invention, but other acids may be used, including but not limited to hydrochloric acid and sulfuric acid.

TABLE 1

Reaction of Bleach controlled by content of NaOH

| NaOH | pH | | | Absorbance | | % Reacted |
|---|---|---|---|---|---|---|
| g/L | Before | After | ΔpH | 30 s | Final | at 30 s |
| 2.50 | 12.67 | 12.61 | −0.06 | 0.152 | 0.533 | 28.5 |
| 1.25 | 12.42 | 12.33 | −0.09 | 0.280 | 0.532 | 53 |
| 0.52 | 12.15 | 12.09 | −0.06 | 0.484 | 0.523 | 92.5 |
| 0.0 | 10.70 | 11.39 | +0.69 | 0.533 | 0.532 | 100 |

TABLE 2

Carbon Dioxide added to Solution of Bleach containing 4 g/L NaOH

| mM | Present in Solution (mN) | | | pH | | | Absorbance | | | % Reacted |
|---|---|---|---|---|---|---|---|---|---|---|
| $CO_2$ | NaOH | $Na_2CO_3$ | $NaHCO_3$ | Before | After | ΔpH | 30 s | Final | Change | @ 30 s |
| 0 | 100 | 0 | 0 | 13.05 | 12.99 | −0.06 | 0.073 | — | — | 16 |
| 14 | 72 | 28 | 0 | 12.96 | 12.93 | −0.03 | 0.088 | 0.450 | — | 20 |
| 25 | 50 | 50 | 0 | 12.80 | 12.74 | −0.06 | 0.143 | 0.468 | — | 31 |
| 37.5 | 25 | 75 | 0 | 12.54 | 12.47 | −0.07 | 0.247 | 0.459 | — | 54 |
| 45 | 10 | 90 | 0 | 12.68 | 12.61 | −0.07 | 0.364 | 0.458 | — | 79 |
| 50 | 0 | 100 | 0 | 11.86 | 11.92 | +0.06 | 0.472 | 0.471 | −0.001 | 100 |
| 55 | 0 | 90 | 10 | 11.80 | 12.05 | +0.25 | 0.469 | 0.466 | −0.003 | 100 |
| 62.5 | 0 | 75 | 25 | 10.48 | 11.26 | +0.78 | 0.471 | 0.467 | −0.004 | 100 |
| 75 | 0 | 50 | 50 | 10.01 | 10.86 | +0.85 | 0.476 | 0.464 | −0.012 | 100 |
| 87.5 | 0 | 25 | 75 | 9.80 | 10.69 | +0.89 | 0.486 | 0.460 | −0.026 | 100 |
| 100 | 0 | 0 | 100 | 9.56 | 10.50 | +0.94 | 0.527 | 0.475 | −0.052 | 100 |

TABLE 3

Process Control by Monitoring Increasing Absorbance

| $CO_2$ Added (mM) | ΔC | Absorb. @ 30 s | ΔA | ΔA/ΔC | ΔA/A | ΔC/C | (ΔA/A)/(ΔC/C) |
|---|---|---|---|---|---|---|---|
| 0 | | 0.073 | | | | | |
| 7 | 14 | 0.0805 | 0.015 | 0.0011 | 0.1863 | 2 | 0.0932 |
| 14 | | 0.088 | | | | | |
| 19.5 | 11 | 0.1155 | 0.055 | 0.0050 | 0.4762 | 0.5641 | 0.8442 |
| 25 | | 0.143 | | | | | |
| 31.25 | 12.5 | 0.195 | 0.104 | 0.0083 | 0.5333 | 0.4000 | 1.3333 |
| 37.5 | | 0.247 | | | | | |
| 41.25 | 7.5 | 0.3055 | 0.117 | 0.0156 | 0.3830 | 0.1818 | 2.1064 |
| 45 | | 0.364 | | | | | |
| 47.5 | 5 | 0.4180 | 0.108 | 0.0216 | 0.2584 | 0.1053 | 2.4545 |
| 50 | | 0.472 | | | | | |
| 52.5 | 5 | 0.4705 | −0.003 | −0.0006 | −0.0064 | 0.0952 | −0.0670 |
| 55 | | 0.469 | | | | | |
| 58.75 | 7.5 | 0.470 | 0.002 | 0.0003 | 0.0043 | 0.1277 | 0.0333 |
| 62.5 | | 0.471 | | | | | |
| 68.75 | 12.5 | 0.4375 | 0.005 | 0.0001 | 0.0114 | 0.1818 | 0.0629 |
| 75 | | 0.476 | | | | | |
| 81.25 | 12.5 | 0.481 | 0.010 | 0.0004 | 0.0208 | 0.1538 | 0.1351 |
| 87.5 | | 0.486 | | | | | |
| 93.75 | 12.5 | 0.5065 | 0.041 | 0.0033 | 0.0809 | 0.1333 | 0.6071 |
| 100 | | 0.527 | | | | | |

The invention claimed is:

1. A method to produce hypobromite ion
wherein a solution comprising bleach, an amount of acid and a soluble bromide salt is provided,
predetermined time for reaction is provided, and
a function F selected from the class consisting of
transmittance of light T and absorbance of light A
at a predetermined wavelength is measured,
wherein the amount of acid in said solution is not less than the amount at which absolute value of dF/dC (that is, the derivative of function F over concentration of acid C) has a maximum value, whereby the amount of hypobromite produced exceeds the amount of hypobromite that would be produced with no acid in said solution.

2. The method of claim 1 wherein the minimum amount of said acid has been determined by increasing the amount of acid in said solution until absorbance essentially stops increasing.

3. The method of claim 2 wherein said soluble bromide salt is selected from the class consisting of lithium bromide, sodium bromide and potassium bromide and said solution also contains water of dilution.

4. The method of claim 3 wherein said acid is carbon dioxide.

5. The method of claim 1 where the amount of acid added is such that absolute value of dF/dC (the derivative of F over concentration of acid C) does not exceed a predetermined value.

6. The method of claim 1 wherein d Ln A/d ln C (the derivative of the natural logarithm of absorbance A over the natural logarithm of concentration of acid C) does not exceed a predetermined value.

7. The method of claim 6 wherein said soluble bromide salt is selected from the class consisting of lithium bromide, sodium bromide and potassium bromide and said solution also contains water of dilution.

8. The method of claim 6 wherein said acid is carbon dioxide.

9. The method of claim 8 wherein said solution also includes a calcium carbonate inhibitor.

10. The method of claim 6, wherein said hypobromite ion is delivered to a cooling tower or other process or device using water that contains ammonia or ammonium ion.

11. The method of claim 1 wherein said soluble bromide salt is selected from the class consisting of lithium bromide, sodium bromide and potassium bromide and said solution also contains water of dilution.

12. The method of claim 11 wherein said acid is carbon dioxide and said solution also includes a calcium carbonate inhibitor.

13. The method of claim 11, wherein said hypobromite ion is delivered to a cooling tower or other process or device using water that contains ammonia or ammonium ion.

14. The method of claim 1 wherein absolute value of d Ln T/d Ln C (the derivative of natural logarithm of transmittance over the natural logarithm of concentration of acid) does not exceed a predetermined value.

15. The method of claim 14 wherein said soluble bromide salt is selected from the class consisting of lithium bromide, sodium bromide and potassium bromide and said solution also contains water of dilution.

16. The method of claim 14 wherein said acid is carbon dioxide.

17. The method of claim 16 wherein said solution also includes a calcium carbonate inhibitor.

18. The method of claim 1 wherein the minimum amount of acid is determined by increasing the amount of acid in said solution until transmittance essentially stops decreasing.

19. The method of claim 18 wherein said soluble bromide salt is selected from the class consisting of lithium bromide, sodium bromide and potassium bromide and said solution also contains water of dilution.

20. The method of claim 19 wherein said acid is carbon dioxide.

\* \* \* \* \*